Nov. 29, 1949  J. C. LYON  2,489,968
SUSPENSION, ESPECIALLY FOR VEHICLES
Filed Sept. 19, 1946
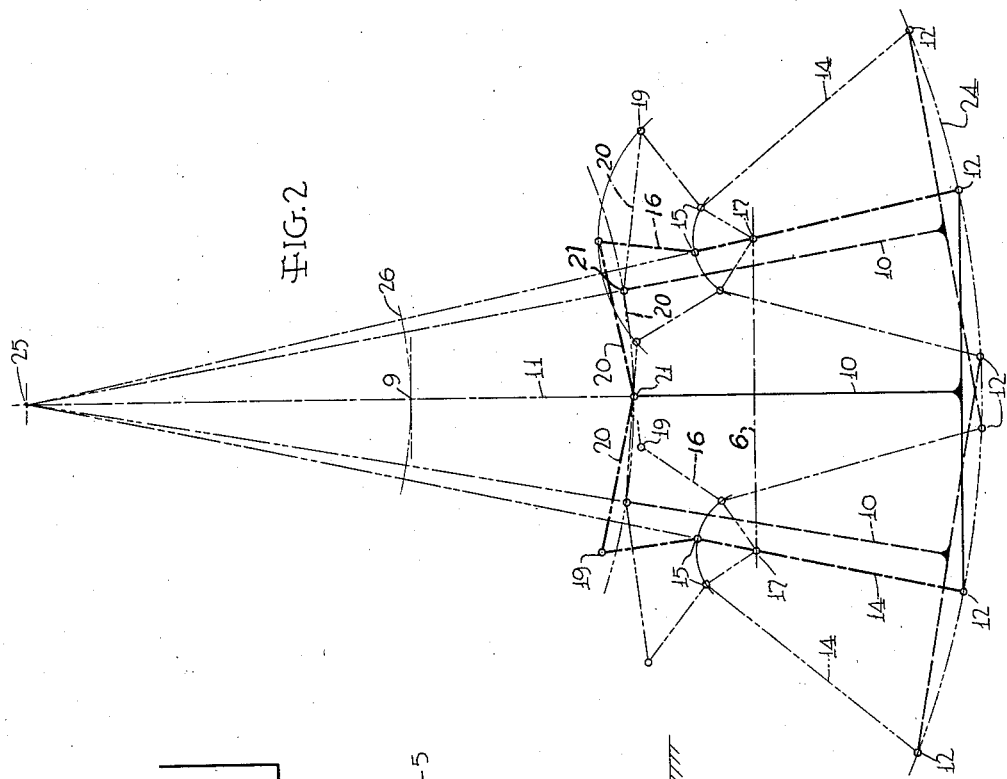
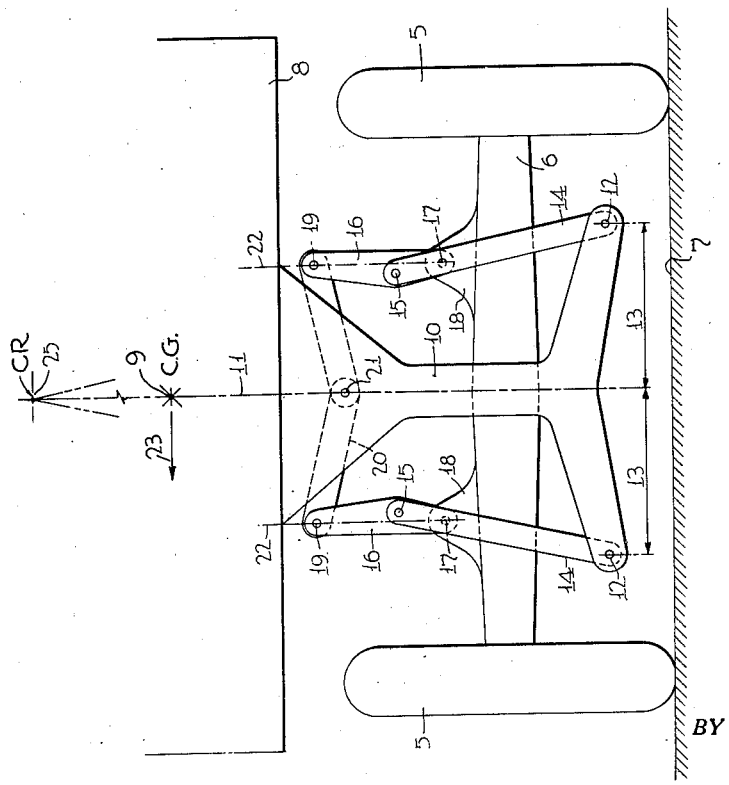
INVENTOR
John C. Lyon
BY *Ansel B. White*
ATTORNEY Patented Nov. 29, 1949

2,489,968

UNITED STATES PATENT OFFICE 2,489,968

SUSPENSION, ESPECIALLY FOR VEHICLES

John C. Lyon, Upper Darby, Pa., assignor to The Budd Company, Philadelphia, Pa., a corporation of Pennsylvania Application September 19, 1946, Serial No. 698,021

7 Claims. (Cl. 280—124)

The invention relates to a suspension and, more particularly, to a suspension for vehicles such as automobiles, railway cars and the like.

Still more specifically, the invention relates to a so-called banking suspension of a vehicle, that is, a suspension due to which, during the passage of the vehicle through a curve, the upper part of the body will lean inwardly toward the center of the curve.

Among the objects of the invention is a suspension of the indicated type which is of simple and rugged construction.

Another object of the invention is a suspension of the indicated type which has all its parts arranged under the floor or at least under the center of gravity of a vehicle body, or chassis, whereas the center of rotation, of course, has to be arranged above the center of gravity.

A still further object of the invention is a suspension of the hanger type which has a far wider range of response to centrifugal force than known suspensions of this type.

The objects of the invention are achieved by a hanger suspension of the body on its support in which the upper ends of the hangers are moved sideways with the lower ends, yet to a lesser degree. More specifically, the invention contemplates the movement of the upper end of the hanger on upwardly convex curves having gradings smaller than the length of the hangers.

The objects of the invention are achieved by certain details of construction and arrangement, and by the geometry of the movements of the different parts, all of which will be more easily understood from the attached diagrammatic illustration and the following description of an embodiment of the invention. This description will also reveal further objects, advantages and features of the invention.

In the drawing:

Figure 1 is a fragmentary diagrammatic end elevation of the lower part of a vehicle body, a supporting axle with wheels, and the new suspension between body and axle; and Figure 2 is a diagram of the movements of body and suspension mechanism as per Figure 1 under the influence of centrifugal forces.

A serious shortcoming of the known hanger suspensions for vehicles widely used on railway car trucks consists in the fact that the range of response to centrifugal forces is extremely small. In these known constructions, a slight transverse movement of the body brings the hanger on the outside of the curve in line with the center of gravity and the momentary center of rotation with the effect that all swinging movement is terminated.

So as to overcome this shortcoming, many proposals have been made to support the body by means of curved guides and the like which give the body a center of rotation above the center of gravity, and which allow a much larger swinging movement than the known hanger constructions. Some disadvantages of these constructions are that they are relatively complicated, have large moving surfaces which require attendance, such as lubrication, and that they interrupt the firm connection between the body and its support.

The invention is believed to overcome these shortcomings of the known constructions.

Before beginning the description of the illustrated embodiment, attention is directed to the fact that no spring suspension is shown. This method of description is adopted to simplify understanding of the basic principle of the invention. Obviously, springs may be provided at proper places, as long as the spring suspension does not interfere with the movement of the body as achieved by the new suspension.

In the illustrated structure, wheels 5 support an axle 6 on the ground surface 7, and the axle supports the body 8 which may have its center of gravity at 9. Of course, 8 might be a chassis supporting, on its part, the body, or it might be a bolster of the truck of a railway car.

Body 8 has secured to its underside a downward extension 10 near the longitudinal vertical center plane indicated by line 11. Journalled to the extension 10 at 12, that is, at the distances 13 from the plane 11, are two links 14. These links 14 extend from the points 12 below the axle 6 upwardly to the points 15 above the axle 6 at slight inclinations toward the center plane 11.

The links or hangers 14 are journalled at 15 to mid-points of a second pair of links 16 which have their lower ends journalled at 17 to projections 18 of the axle 6. The upper ends of the links 16 are journalled at 19 to links 20 of a third pair of links. The links 16 are substantially vertically arranged in the position illustrated in Figure 1, and the links 20 are arranged about horizontally and have their other ends journalled at 21 to the extension 10 near the underside of the body. Preferably, the links 20 are slightly inwardly and downwardly inclined.

Whereas the journal connections 17 and 19 of the links 16 may be arranged in vertical planes 22 in the normal position illustrated in Figure 1, the journal points 15 are preferably arranged on one side, in the illustrated embodiment on the inside, of the vertical planes 22 passing through the connections 17. Such arrangement is advisable to avoid an unstable suspension in the middle position which might adversely influence the riding comfort. Besides, the arrangement of points 15 as shown causes initial lifting of the one point on the outside and lowering of the other point on the inside of the curve which gives the proper initial movement to the points 12.

When the vehicle negotiates a curve and, consequently, the centrifugal force indicated by the arrow 23 acts on the center of gravity 9 of the body, the joints 12 between the body extension 10 and the links or hangers 14 will be moved in the same direction, but simultaneously the joints on the outside of the curve will swing upwardly and on the inside of the curve downwardly about the journals 15. Simultaneously, the journal connections 15 will swing transversely about the journal 17 on account of the transverse movement imparted to the upper end 19 of the link 16 by the links 20 and their connection to the body at 21. The relatively great length of the links 16 requires a relatively small force to be transmitted by the links 20 which contributes to the stability and proper operation of the device.

The aforesaid briefly outlined composite movements lead to a resultant movement of points 12 on a circle indicated in Figure 2 by line 24 and having its center at 25, that is, high above the center of gravity 9. Of course, the center of gravity likewise moves on a circle 26 with the same center 25 as do all other points of or connected with the body 8.

Different positions of the body relative to the fixed points represented by the journals 17 on the axle 6 are illustrated in Figure 2 by different types of lines. This illustration is believed to be self-explanatory so that no further extensive description is necessary. It should be pointed out, however, that the hangers 14 swing on a circle of relatively large radius about their suspension points 15, whereas the points 15 move on upwardly convex circles of relatively small radius about the journals 17. An outward movement of one of the lower ends of the hangers 14, therefore, involves movement on an upward curve about point 15, whereas point 15 moves simultaneously downwardly by swinging about the joint 17. This last statement, obviously, is true only after point 15, on the outward stretch, has passed its upper dead center; however, movement from the normal position shown in Figure 1 and in full lines in Figure 2 to the dead center and slightly therebeyond may be considered as a practically horizontal movement.

Obviously, the location of the imaginary center of rotation 25 is based on the original location and inclination of the different links and hangers and on the distances between the different journals of the links and hangers. Shortening of the links 14 causes movement on a circle with a smaller radius. The same effect will be achieved by increasing the movement of the journals 15, e. g., by decreasing the length of the links 16 between their journals 17 and 19.

As pointed out in the beginning, no spring suspension is shown. To give an idea of what spring suspensions could be used, it is pointed out that 8 might represent a supporting structure which, by means of springs, carries the vehicle body in collaboration with guiding means which permit only translational up and down movement between such support and the body so that centrifugal forces could not lead to an undesired outward inclination of the body relative to the support. In a similar manner, the axle 6 may be spring supported from the wheels by means not permitting the axle to change its parallel position relative to the road surface but permitting only vertical up and down movement. There is no need to illustrate such spring suspensions because they are well known in the art.

The invention is not restricted to the diagrammatically illustrated embodiment, but modifications based on the principles and the spirit of the invention will easily occur to those skilled in the art. More specifically, it is obvious that means other than the links 20 may be employed for controlling the movement of the links 16, or that other means may be employed for imparting the transverse movement to the upper ends of the hangers 14. On the other hand, the employment of links throughout with interconnecting journals is believed preferable to any other scheme which might require sliding surfaces.

Patent protection is sought for the invention as broadly as expressed by the language and the spirit of the attached claims.

What is claimed is:

1. In a vehicle suspension: a supporting structure and a supported structure, a pair of hangers arranged in close proximity to the vertical position at a distance from each other in transverse direction and each connected by its lower end to said supported structure and by its upper end to a mid-portion of another link of a second pair of shorter upstanding links, said shorter links having their lower ends journalled to transversely spaced points of said supporting structure and their upper ends to the outer ends of a third pair of substantially horizontally arranged links, the links of said third pair having their inner ends journalled to said supported structure.

2. In a vehicle suspension: a supporting structure and a supported structure, a pair of links extending from transversely spaced points of said supported structure upwardly to mid-portions of another pair of shorter upstanding transversely spaced links, said shorter links having their lower ends journalled to transversely spaced points of said supporting structure and their upper ends journalled to said supported structure by means permitting substantially free up and down movement only relative to said supported structure.

3. In a suspension: a body and a support therefor, a first pair and a second pair of generally upright links, journal connections between the lower ends of the links of the first pair and widely spaced points of said body, journal connections between the lower ends of the links of the second pair and widely spaced points of said support, journal connections between two links each of different pairs at points above the aforesaid journal connections, and means between said second pair of links and said body for imparting transverse movement of the latter to the last-named links.

4. In a suspension of a vehicle body on a support carried by the ground, two hangers journalled separately from each other swingably about parallel axes by their lower ends to said body at points which are widely spaced from each other transversely to said axes and by their upper ends to means connected with said support for transverse movement on an upwardly convex curve of less radius than the length of the hangers upon transverse movement of body and support.

5. In a suspension of a vehicle body on a support carried by the ground, two hangers journalled separately from each other swingably about parallel axes by their lower ends to said body at points which are widely spaced from each other transversely to said axes and by their upper ends to means connected with said support for transverse movement, upon transverse movement of body and support, on an upwardly convex curve of less radius than the length of the hangers from a mid-position near the highest point of said curve.

6. In a suspension of a vehicle body or chassis structure on a transverse support such as a wheel carrying axle, a downward extension of said structure intersecting said support, a pair of hangers journalled swingably about parallel axes by their lower ends to said extension at points which are widely spaced from each other transversely to said axes and arranged below said support, means connecting the upper ends of said hangers to said support between it and said structure for transverse movement of said upper ends upon transverse movement of body and support.

7. In a suspension of a body on a support, a pair of hangers journalled swingably about parallel axes by their lower ends to said body at points which are widely spaced from each other transversely to said axes, means connecting the upper less widely spaced ends of said hangers to said support for transverse movement thereof, upon transverse movement of body and support, on upwardly convex curves of less radius than the length of the hangers from points which are arranged close to but slightly nearer together than the highest points of the curves.

JOHN C. LYON.

REFERENCES CITED

The following references are of record in the file of this patent:

UNITED STATES PATENTS

| Number | Name | Date |
| --- | --- | --- |
| 2,208,628 | Breer | July 23, 1940 |
| 2,242,584 | Kolbe | May 20, 1941 |